No. 661,956. Patented Nov. 20, 1900.
A. D. DAVIS.
REVERSIBLE BACK FOR CAMERAS.
(Application filed May 24, 1899.)
(No Model.)
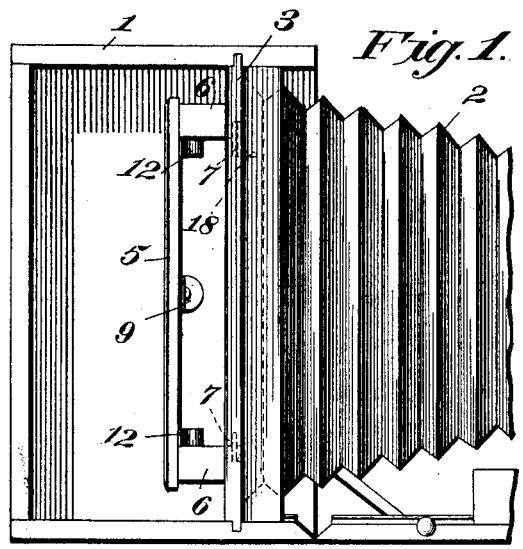
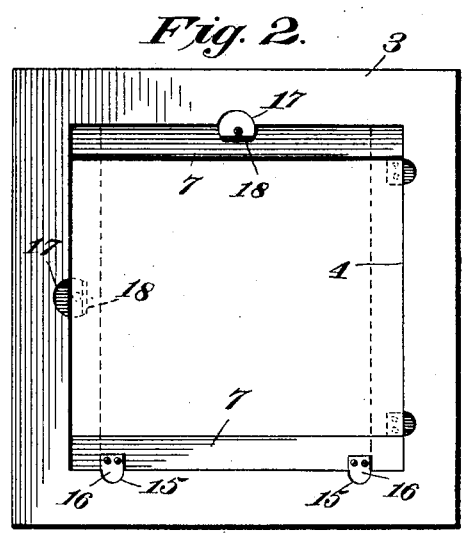
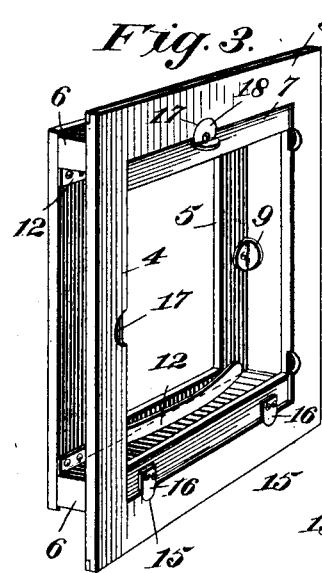
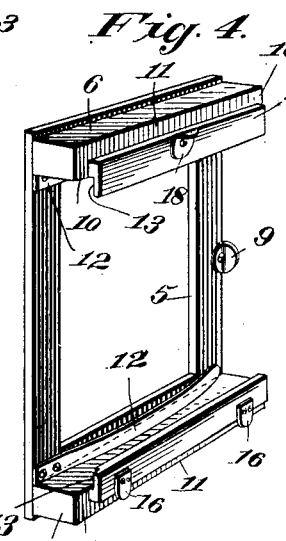
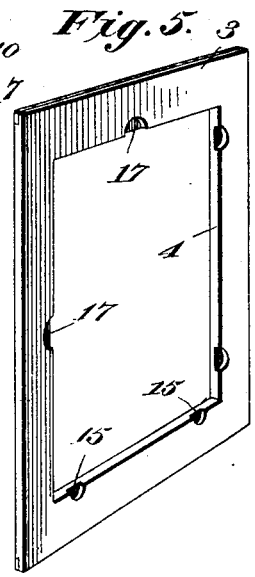
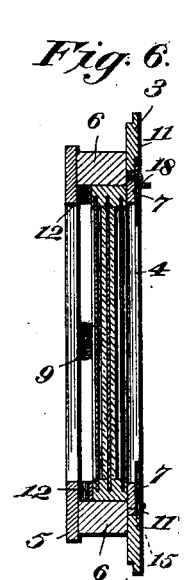
WITNESSES:
Chester A. Baker
L. C. Hills
INVENTOR
Albert D. Davis
BY
Attorney
THE NORRIS PETERS CO., PHOTO-LITHO., WASHINGTON, D. C.

UNITED STATES PATENT OFFICE.

ALBERT D. DAVIS, OF YONKERS, NEW YORK.

REVERSIBLE BACK FOR CAMERAS.

SPECIFICATION forming part of Letters Patent No. 661,956, dated November 20, 1900.

Application filed May 24, 1899. Serial No. 718,113. (No model.)

*To all whom it may concern:*

Be it known that I, ALBERT D. DAVIS, a citizen of the United States, residing at Yonkers, in the county of Westchester and State of New York, have invented certain new and useful Improvements in Reversible Backs for Cameras; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to cameras, and has for its object to provide a reversible back to a camera so formed that by removing and changing the position of the plate-holder frame the opening in the rear end of the camera-body will be changed from a vertical to a horizontal parallelogram, or vice versa, and the plate-holder may lie close to the division-frame when inserted in the plate-holder frame.

It has further for its object to improve the construction so as to make certain joints light-tight.

To the accomplishment of the foregoing and such other objects as may hereinafter appear the invention consists in the construction and also in the combination of parts hereinafter particularly described and then sought to be clearly defined by the claims, reference being had to the accompanying drawings, forming a part hereof, and in which—

Figure 1 is a side elevation of a camera having my invention applied thereto, one side of the camera-body being open. Fig. 2 is a front view of the division-frame between the ends and the plate-holder, showing in full lines the position of the plate-holder frame when forming a horizontal parallelogram and in dotted lines its position when forming a vertical parallelogram. Fig. 3 is a perspective of the division-frame and plate-holder frame. Fig. 4 is a perspective of the plate-holder frame; Fig. 5, a perspective of the division-frame; Fig. 6, a central vertical section through Fig. 3; and Fig. 7 is a cross-section through the division-frame, plate-holder frame, and plate-holder.

In the drawings the numeral 1 designates a camera-body of any approved pattern, and 2 the bellows, while 3 designates the division-frame between the lens and plate-holder and formed with a square opening 4 and which may be a part of the body of the camera or made adjustable with respect to the same, as is common in many cameras and which need not be illustrated in detail, as such feature does not constitute my invention.

The numeral 5 designates the plate-holder frame, which has the two opposite side pieces 6, adapted to lie against the division-frame 3, as illustrated in Fig. 1 of the drawings, and is provided with the oppositely-arranged strips 7, adapted to lie inside of the square opening in the division-frame at two opposite points, as shown by full lines in Fig. 2 of the drawings, so as to convert the square opening in the division-frame into a parallelogram, as indicated in said figure of the drawings, thus adapting the camera to take a horizontal picture, and when in such position the plate-holder may be inserted through the side of the camera-body into the plate-holder frame, the plate-holder being checked or limited in its movement by the stop 9, against which its end will bear. The strips 7 are secured to the faces of the side pieces 6, and as the stops are shorter than the pieces 6 they form offsets 9 at the opposite ends of the strips and also an offset 10 along the edges thereof, so that when the strips are brought inside the square opening of the division-frame the side pieces 6 will lie flush with the face of the division-frame, and thus serve to make the joints light-tight along such offsets.

When it is desired to take a vertical picture, the plate-holder frame is removed and turned one-quarter around, so as to bring the strips 7 to the sides of the square opening in the division-frame, as indicated by dotted lines in Fig. 2 of the drawings, the strips lying inside of said opening, as in the other position, thus converting the square into a vertical parallelogram instead of into a horizontal parallelogram, as in the other position, the offsets 10 and 11 forming a light-tight joint, as before. In this changed position of the plate-holder frame the plate-holder will be inserted from the top instead of from the side, the camera-body having a door in the top for the purpose. The change from one position to the other is easily and quickly made, and by the simple manipulation described the back for the camera is reversed from one position to another, so as to take a vertical or a horizontal picture as desired. This construction also enables the plate-holder to move close to the surface of the division-frame, thus dispensing with the intervening frame between the plate-holder and division-frame that is used in some other constructions of cameras and making my camera that much shorter. The plate-holder is pressed against the division-frame by the strips 12.

It will be observed that the strips 7 are formed with recesses or rabbits 13, which are designed to receive the head or tongue 14, which extends across the plate-holder near one end, so as to shut out light that might otherwise leak in at those points.

The plate-holder frame with its strips 7, may be secured to the division-frame by any suitable means. For that purpose I have illustrated the division-frame as formed with depressions or recesses 15 to receive lips 16, secured to one of the strips of the plate-holder frame, and with depressions or recesses 17 to receive a turn-button 18, secured to the other strip. By tilting one end of the plate-holder frame so as to bring the lips 16 into their recesses and then when the frame is brought into position turning the button 18 so as to bring it into its recess, the frame and its strips will be securely held in place. This is given merely as an illustration of one means that may be used for the purpose, and it is to be understood that I am not limited thereto and may use any other suitable means for the purpose.

I have illustrated and described what I consider at this time to be the best construction and the best arrangement of parts to accomplish the objects stated; but I do not limit myself to such details except where specified in the claims, as changes can be made and the essential features of my invention still be employed. For an instance of one change that can be made I may omit one of the strips 7 instead of using two such strips, and such change would be included within the scope of my invention.

Having described my invention and set forth its merits, what I claim is—

1. In a camera having a square opening in the division-frame between the lens and the plate-holder, a changeable plate-holder frame provided with a member adapted to fit inside of the division-frame to convert the square opening in the division-frame into a parallelogram and permit the plate-holder to lie close to said division-frame when placed in the plate-holder frame, substantially as described.

2. In a camera having a square opening in the division-frame between the lens and the plate-holder, a changeable plate-holder frame provided with strips on different sides adapted to fit inside of the square opening in the division-frame to convert the square opening in the division-frame into a parallelogram and permit the plate-holder to lie close to said division-frame when placed in the plate-holder frame, substantially as described.

3. In a camera, the combination with the division-frame having an opening, of the changeable plate-holder frame, one of said frames being adapted to fit within the other and describing a parallelogram with relation to the other, and one being changeable with relation to the other so as to convert the opening into a horizontal or a vertical parallelogram according to the position in which one may be arranged in relation to the other, and whereby the plate-holder may lie close to the division-frame when placed in the plate-holder frame, substantially as described.

4. In a camera, the combination with the division-frame having a square opening, of the changeable plate-holder frame provided with strips adapted to fit inside of the opening to the division-frame to form either a vertical or a horizontal parallelogram, one of said frames having offsets to form a recess or depression to receive a part of the other frame to form a light-tight joint where the strips meet the division-frame, substantially as described.

5. In a camera, the combination with the division-frame having a square opening, of the changeable plate-holder frame formed with strips to fit in the opening of the division-frame, said strips having rabbets formed therein, and a plate-holder having a tongue to fit in the rabbets of said strips, substantially as described.

6. In a camera, the combination with the division-frame having a square opening, of the changeable plate-holder frame having strips on different sides projecting over the inner edges of the sides of which they form a part and terminating back of the outer edges and of the ends of said sides and adapted to fit inside of the opening to the division-frame, whereby the opening in the division-frame may be converted into a horizontal or a vertical parallelogram and the plate-holder may lie close to the division-frame and light-tight joints are formed, substantially as described.

In testimony whereof I affix my signature in presence of two witnesses.

ALBERT D. DAVIS.

Witnesses:
C. P. MARSDEN, Jr.,
L. R. DICKSON.